(12) United States Patent
Bekker (10) Patent No.: US 7,092,623 B2
(45) Date of Patent: Aug. 15, 2006

(54) METHOD AND APPARATUS TO ACHIEVE ACCURATE FAN TACHOMETER WITH PROGRAMMABLE LOOK-UP TABLE

(75) Inventor: Leonid A. Bekker, Central Islip, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 271 days.

(21) Appl. No.: 10/668,062

(22) Filed: Sep. 22, 2003

(65) Prior Publication Data
US 2005/0238336 A1  Oct. 27, 2005

(51) Int. Cl.
H02P 1/34 (2006.01)
(52) U.S. Cl. .................. 388/829; 388/800; 388/811; 388/819; 318/138; 318/254; 318/439; 318/599
(58) Field of Classification Search ............... 318/254, 318/138, 439, 599, 811, 461, 459, 500; 388/800, 388/811, 819, 829
See application file for complete search history.

(56) References Cited

U.S. PATENT DOCUMENTS

| | | | |
|---|---|---|---|
| 4,722,669 A | | 2/1988 | Kundert |
| 4,727,468 A | | 2/1988 | Maekawa |
| 4,977,375 A | * | 12/1990 | Toth ........................ 324/511 |
| 5,099,181 A | * | 3/1992 | Canon ...................... 318/254 |
| 5,249,741 A | | 10/1993 | Bistline et al. |
| 5,307,439 A | | 4/1994 | Enami |
| 5,513,361 A | * | 4/1996 | Young ....................... 713/320 |
| 5,534,854 A | * | 7/1996 | Bradbury et al. ........... 340/648 |
| 5,687,079 A | | 11/1997 | Bauer et al. |
| 5,727,928 A | | 3/1998 | Brown |
| 5,825,972 A | | 10/1998 | Brown |
| 5,942,866 A | | 8/1999 | Hsieh |
| 5,962,933 A | | 10/1999 | Henderson et al. |
| 5,990,582 A | | 11/1999 | Henderson et al. |

(Continued)

OTHER PUBLICATIONS

Marando et al., U.S. Appl. No. 10/459,169 entitled "Programmable PWM Stretching for Tachometer Measurement", filed on Jun. 11, 2003.

(Continued)

Primary Examiner—Rina Duda
(74) Attorney, Agent, or Firm—Meyertons Hood Kivlin Kowert & Goetzel, P.C.; Jeffrey C. Hood (57) ABSTRACT

A system and method for measuring the speed of a fan is presented. The duty cycle of a pulse width modulated (PWM) power signal may control speed of the fan. The fan may generate tachometer pulses used for monitoring RPM of the fan. Very low frequency test pulses may be generated and provided via a test signal multiplexed with the PWM signal to obtain tachometer pulses present even when the PWM signal is deasserted. The frequency of the test signal may be determined based on the duty cycle of the PWM signal and may be dynamically updated using frequency divider values stored in a user programmable look-up table. The tachometer pulses may be used to reset a flip-flop whose data input is held high and a down counter, which may be operated at a frequency slightly lower than the frequency of the test signal, with the output of the down counter clocking the flip-flop. The output of the flip-flop may provide recreated tachometer pulses to a pulse counter that counts the number of pulses within a determined period of time, providing a measured RPM of the fan.

46 Claims, 3 Drawing Sheets

U.S. PATENT DOCUMENTS

| | | |
|---|---|---|
| 6,182,902 B1 | 2/2001 | Shih |
| 6,188,189 B1 | 2/2001 | Blake |
| 6,208,538 B1 | 3/2001 | Halamik et al. |
| 6,226,324 B1 | 5/2001 | Allstrom |
| 6,247,898 B1 | 6/2001 | Henderson et al. |
| 6,262,549 B1 | 7/2001 | Yang et al. |
| 6,519,167 B1 | 2/2003 | Nguyen |
| 6,528,987 B1 | 3/2003 | Blake et al. |
| 6,563,284 B1 | 5/2003 | Teutsch et al. |
| 6,601,168 B1 | 7/2003 | Stancil et al. |
| 6,650,074 B1 | 11/2003 | Vyssotski et al. |
| 6,661,679 B1 | 12/2003 | Yang et al. |
| 2003/0193307 A1 | 10/2003 | Burstein |
| 2004/0001542 A1 | 1/2004 | Miller, Jr. |

OTHER PUBLICATIONS

Analog Devices, Publication ADM1027, "dBCOOL™ Remote Thermal Controller and Voltage Monitor," 2003, 56 pages.

National Semiconductor Corporation, Publication LM63, "±1°C Accurate Remote Diode Digital Temperature Sensor with Integrated Fan Control," Feb. 2003, 28 pages.

Stephen Ohr, "Analog IC vendors find 'Intel Indside' a safe bet," Sep. 12, 2002 online at http://www.eetimes.com/story/OEG20020912S0026.

* cited by examiner

Fig. 1

| PWM Duty Cycle % (8-bit value) | Fan Rotational Speed /Sec (RPS) | Tachometer Pulses Frequency (Hz) | Tachometer Pulse Width (50% Duty) mS | Min Sampling Frequency (MSF) Hz |
|---|---|---|---|---|
| 6% (16) | No rotation | - | | - |
| 9 % (24) | 10 | 20 | 25 | 40 |
| 12% (32) | 18 | 36 | 14 | 72 |
| 19% (48) | 28 | 56 | 9 | 112 |
| 25% (64) | 37 | 74 | 7 | 148 |
| 37% (96) | 50 | 100 | 5 | 200 |
| 50% (128) | 60 | 120 | 4 | 240 |
| 75% (192) | 74 | 148 | 3.4 | 296 |
| 100% (255) | 86 | 172 | 2.9 | 344 |

Fig. 3

METHOD AND APPARATUS TO ACHIEVE ACCURATE FAN TACHOMETER WITH PROGRAMMABLE LOOK-UP TABLE

BACKGROUND OF THE INVENTION

1. Field of the Invention

This invention relates to cooling equipment for electronic systems, e.g., fans, and more particularly, to measuring the rotational speed of a fan.

2. Description of the Related Art

Fans are often used to evacuate warm air from enclosures in which electronic systems are contained. For example, most computer systems include one or more cooling fans to aid in circulating the air inside the enclosures and for maintaining the temperature inside the enclosures within an acceptable range. The increased airflow provided by fans typically aids in eliminating waste heat that may otherwise build up and adversely affect system operation. Employing cooling fans is especially helpful in ensuring proper operation for certain central processing units (CPUs) with relatively high operating temperatures.

Control of fans in a system typically involves a fan control unit executing a fan control algorithm. A fan control algorithm may determine the method for controlling one or more fans that are configured to evacuate warm air from a system enclosure. For example, the fan control algorithm may specify that a fan's speed should be increased or decreased dependent upon a detected temperature. Such control algorithms may also involve turning off a fan if the temperature is deemed cool enough to do so.

Fans often include a tachometer output that provides a signal indicative of the current speed of the fan. The tachometer signal may be used to determine whether the fan is operating properly. Often, fans used for CPU and/or computer system cooling have a three-wire interface with wires for power, ground, and the tachometer signal. Fan drive systems often use a signal generator that provides a Pulse Width Modulated (PWM) signal to drive an external circuit that controls the voltage between the power and ground interfaces of the fan, which in turn controls the speed of the fan. Signal generators that provide PWM signals are useful because they provide a digital control for the pulse width of a signal. The fan is typically powered only for the duration of the pulse. Between pulses power to the fan is turned off, although the fan is typically still spinning during this time. The duty cycle of the PWM pulse train currently being provided to the fan determines the fan's speed.

One problem associated with using signal generators that provide PWM signals to drive fan circuits is that the tachometer circuitry associated with the fan does not receive power during the time the fan is turned off between the PWM pulses. As a result, the tachometer signal output by the fan may not accurately represent the current fan speed during the time between pulses. Similarly, once the fan is turned off, the tachometer signal does not indicate the speed of the fan as the fan spins down. One technique that is currently used to measure fan speed in these situations involves using an analog filtering system to measure the back Electromotive Force (EMF) inserted into the fan tachometer signal by the rotating fan. Another problem associated with using signal generators that provide PWM signals to drive fan circuits is that multiple cooling zones create the need for multiple sensors and multiple fans, thereby causing the need for complex management schemes in fan operation management.

One digital technique used for measuring fan speed includes stretching the PWM signal pulse to insure that a valid tachometer signal remains asserted until the speed of the fan has been determined in case the duty cycle of the PWM signal would not permit such a measurement. There are, however, disadvantages associated with such techniques, including low accuracy, especially at low PWM duty cycles, fan speed surges resulting directly from stretching the PWM pulse and unwanted fan noise resulting from the fan speed surges. Another drawback is that the stretching typically dominates at low PWM duty cycles. In other words, the fan's speed, which is measured in revolutions-per-minute (RPM), is effectively controlled by the stretching of the PWM pulse and not by the duty cycle itself of the PWM signal. Such techniques generally lead to complicated implementations with significant impact on die size, and are typically prone to electrical noise sensitivity.

Many other problems and disadvantages of the prior art will become apparent to one skilled in the art after comparing such prior art with the present invention as described herein.

SUMMARY OF THE INVENTION

In one set of embodiments, the invention comprises a system and method for measuring the speed of a fan. The fan may be a breakable-ground-controlled fan in an electrical system. A breakable-ground-controlled fan is a fan which may have its power terminal uninterruptedly tied to a supply voltage, while on/off switching of the fan is achieved through connecting/disconnecting the fan's ground terminal to/from ground. In one embodiment, the duty cycle of a PWM signal provided by a signal generator output controls the speed of the fan, while a tachometer reading-unit monitors the revolutions per minute (RPM) of the fan. Instead of driving the fan directly, the PWM signal may switch a fan driver circuit, which may provide adequate power to spin the fan. In one embodiment, the fan generates a tachometer signal comprising tachometer pulses (also referred to as a fan pulses) that are used by the tachometer reading-unit to measure the RPM of the fan.

Very low frequency test (VLFT) pulses may be generated and provided through a test signal multiplexed with the PWM signal to sample the fan generated tachometer pulses. The VLFT pulses of the test signal may operate to determine if the tachometer signal reaching the tachometer reading-unit is high or low. The VLFT pulses may ensure that tachometer pulses that may be generated by the fan are available even when the PWM signal is low. This essentially facilitates "recreating" the tachometer pulses. Recreated tachometer pulses may have variable width since the fan and VLFT pulses of the test signal may for the most part be asynchronous with respect to each other, although the number of tachometer pulses for a period of time will be commensurate with the actual fan rotation. In one embodiment, the frequency of the test signal (which comprises the VLFT pulses) is selected to be at least twice the highest attainable frequency of the fan generated tachometer pulses, per Nyquist's sampling theorem. In some embodiments the speed of the fan may not increase, though it may decrease, due to causes other than the PWM signal generator. In such embodiments the highest attainable frequency of the fan generated tachometer pulses may be reached when the PWM duty cycle is 100%, and the frequency of the test signal may also be adjusted as a function of the PWM duty cycle value, still observing Nyquist's sampling theorem.

In one set of embodiments, empirical data may be used to determine a number of different frequencies for the test signal, for instance five or six frequencies corresponding to PWM duty cycles of 9%, 12%, 25%, 50%, 75%, and 100% may be obtained. Furthermore, the frequencies may be automatically selected using the high bits of the duty cycle of the PWM signal, which may be stored in a duty cycle register. In one set of embodiments, frequency divider values may be calculated for each selected area of PWM duty cycle values and stored in a look-up table. The frequency divider values may be stored in the table prior to system operation, or they may be user programmable into the look-up table during system operation. The different frequencies corresponding to various PWM duty cycle values may vary from fan to fan, and frequency divider values corresponding to the different frequencies for different fans may all be programmed into the look-up table during system operation for any particular fan used during system operation.

In one embodiment, the tachometer reading-unit includes a flip-flop and a down counter (frequency divider), with the tachometer signal, which comprises the fan generated tachometer pulses, providing a reset signal to the flip-flop and to the down counter. In this embodiment, the frequency of the output signal of the down counter is slightly lower than the frequency of the test signal. The output of the down counter may be used to clock the flip-flop, which may have a constant value of "1" tied to its data input port. The output of the flip-flop may provide the recreated tachometer pulses, (or recreated fan rotational pulses). The recreated tachometer pulses may be the input to a counter that is gated (turned on) for a determined time period, with the output of the counter providing the measured RPM of the fan. One advantage of the method described herein is a solution to the problem arising from the tachometer pulses not always being seen by the tachometer reading-unit due to the fan driver not propagating the tachometer pulses when the PWM signal is deasserted. This problem may be worse at low PWM duty cycles since the sample window can be narrower than the fan pulses. Embodiments of the present invention may provide a solution without requiring a stretching of PWM pulses, while counting a number of captured pulses generated by the fan, instead of counting an elapsed time period in-between pulses.

Thus, various embodiments of the systems and methods described above may facilitate design of a system to accurately measure the speed of a fan in an electrical system, while minimizing audio noise and sensitivity to electrical noise, and maintaining smooth fan operation.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

As used herein, a "trigger" signal is defined as a signal that is used to initiate, or "trigger", an event or a sequence of events in a digital system. A trigger signal is said to be in a "triggering state" at a time when it initiates a desired event, or sequence of events. A periodic trigger signal may commonly be referred to as a "clock". In a "synchronous" digital system, generally a clock, commonly referred to as a "system clock", may be used for initiating most events, or sequences of events. An example of a triggering state may be, but is not limited to, a rising edge of a pulse of a clock in a synchronous digital system. A "frequency" of pulses refers to a number of pulses that may appear within a selected unit period of time. For example, if twenty pulses appear within duration of one second, then the frequency of the pulses is 20 Hz.

When an event, or a sequence of events, is said to be initiated "in response to" receiving a stimulus signal, it may be implied that the event, or the sequence of events, is initiated as a result of a combination of a trigger signal, used in triggering the event or sequence of events, being in a triggering state at a time when the stimulus signal is asserted. In one set of embodiments, the sending of a pulse through an output port may indicate a point in time at which a leading edge of the pulse occurs at the output port, and the receiving of a pulse through an input port may indicate a point in time at which a leading edge of the pulse occurs at the input port. As used herein, "setting" a device refers to setting an output of the device to a high logic level, whereas "resetting" a device refers to setting an output of the device to a low logic level. It will be evident to those skilled in the art that a high logic level may be physically represented by either a high voltage or a low voltage, and similarly a low logic level may be physically represented by either a low voltage or a high voltage.

When referencing a pulse of a signal, a "leading edge" of the pulse is a first edge of the pulse, resulting from the value of the signal changing from a default value, and a "trailing edge" is a second edge of the pulse, resulting from the value of the signal returning to the default value. When data is said to be "registered" or "latched" "using" a signal, the signal acts as a trigger signal that controls the storing of the data into the register or latch. In other words, when a signal "used" for registering or latching data is in its triggering state, the data residing at respective input ports of the register or latch is stored into the register or latch. Similarly, when data is latched "on the leading edge" or "on the trailing edge" of a pulse of a clock, the data residing at respective input ports of a register or latch is stored into the register or latch, respectively, when a leading edge or a trailing edge of a pulse of the clock occurs, respectively.

Figure 1:
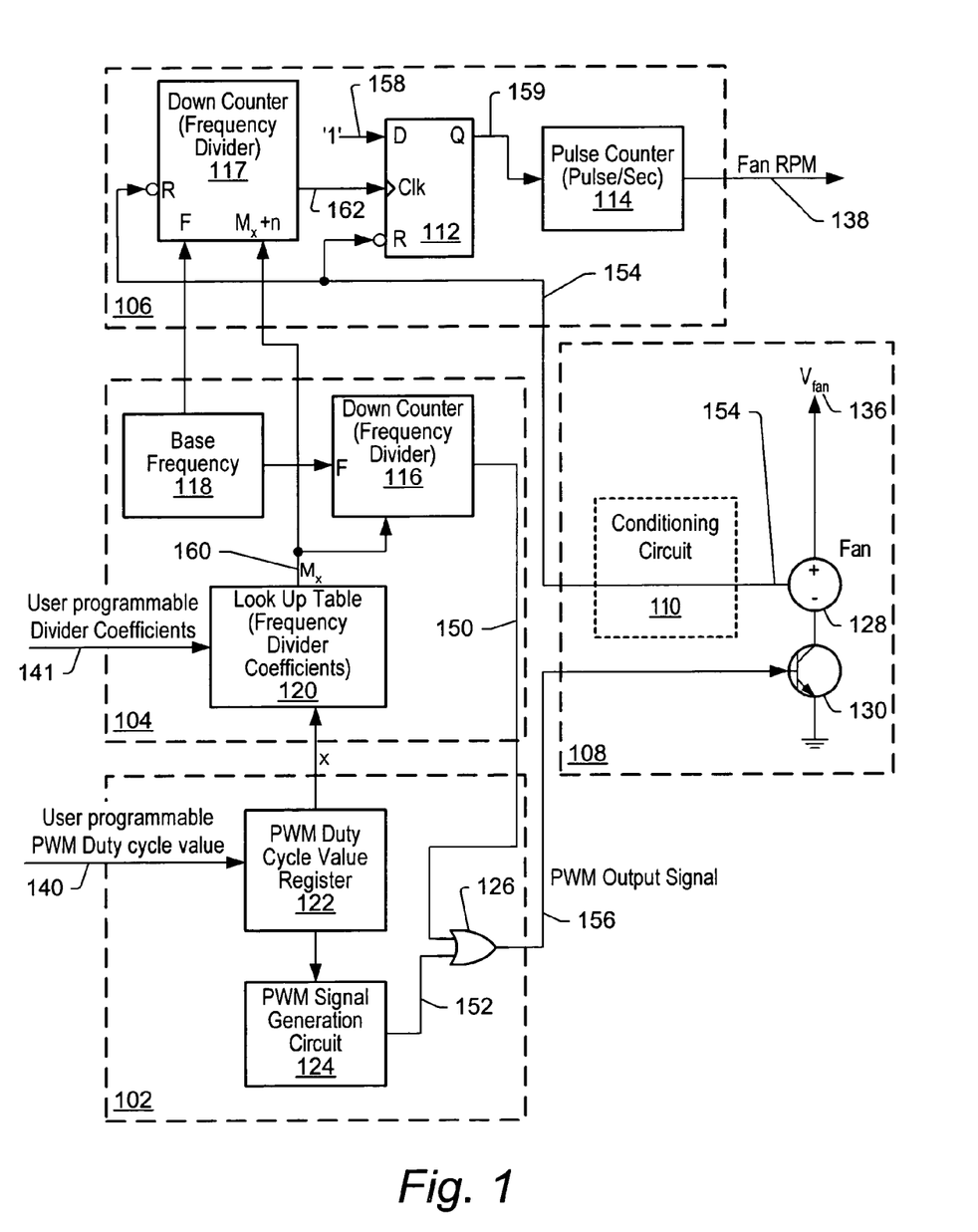
FIG. 1 illustrates one embodiment of a system to measure the speed of a fan, implemented in accordance with the present invention.

FIG. 1 illustrates one embodiment of a system to measure the speed (or RPM) of a fan 128, implemented in accordance with the present invention. In this embodiment, the system includes a fan unit (FU) 108, a signal generator (SG) 102, a test signal generation circuit (TSG) 104, and a tachometer reading-unit (TRU) 106. TSG 104 may generate a test signal 150 which may be used by TRU 106 in recreating tachometer pulses generated by FU 108. The tachometer pulses generated by FU 108 may be provided to TRU 106 via a tachometer signal 154. Test signal 150 may also be multiplexed with a PWM signal 152, which is generated by a PWM generation circuit 124 to control the speed of fan 128 that may be included in FU 108. In one embodiment, fan 128 is a 3-wire fan capable of generating tachometer pulses. Test signal 150 and PWM signal 152 may be provided as inputs to an OR gate 126, the output of OR gate 126 providing a combined PWM output 156 to FU 108. Fan 128 may be coupled to a fan supply voltage 136 and to the collector of a transistor 130 that may also be included in FU 108, with PWM output 156 coupled to the base of transistor 130, in effect controlling on/off switching of transistor 130. When transistor 130 is operating in an "on" mode, fan 128 may provide a determined number of tachometer pulses per revolution of fan 128. The tachometer pulses may be sent as the reset input to a flip-flop 112 and to a down counter 117 via tachometer signal 154 that comprises the tachometer pulses. Output signal 162 of down counter 117 may be used as the clock input of flip-flop 112, which may have its data input 158 tied to a logic value of "1". In some embodiments, a conditioning circuit 110 that may also be included in FU 108 may process tachometer signal 154 prior to tachometer signal 154 being provided to flip-flop 112 and to down counter 117. While FIG. 1 illustrates an embodiment that employs a flip-flop, those skilled in the art will appreciate that other types of latches, for example an SR-latch, may be used in lieu of the flip-flop.

A user programmable PWM duty cycle value 140 for PWM signal 152 may be programmed into PWM value register 122. The value of the duty cycle may be provided by register 122 to PWM generation circuit 124, which will correspondingly adjust the duty cycle of PWM signal 152, which in turn will result in the speed of fan 128 being adjusted accordingly. For example, at a PWM duty cycle value of 100%, fan 128 may reach a maximum RPM value, while a PWM duty cycle value of 50% would lower the speed of fan 128 from the maximum RPM value. PWM value register 122 may also provide the currently programmed PWM duty cycle value to a lookup table 120. In one embodiment, lookup table 120 holds divider coefficient values, which are provided to a down counter (or frequency counter) 116 for generating test signal 150 based on a base frequency 118 provided to down counter 116. The divider coefficient values may be user programmed into look-up table 120 during system operation.

The divider coefficients for a particular fan may be determined from empirical data for various selected PWM duty cycle values for the fan. In order to obtain the divider coefficients for the fan, a set of PWM duty cycle values may first be selected, and rotational speed of the fan (revolutions per second) may be measured using an optical tachometer. A frequency for the tachometer signal that comprises the tachometer pulses generated by the fan may thus be determined, since the fan will generate a pre-determined number of tachometer pulses per revolution. A minimum frequency for the test signal may be selected such that quantization of the sampling may be equal or higher than quantization of the tested asynchronous sequence (that is, quantization of the tachometer pulses generated by the fan). Furthermore, Nyquist's sampling theorem may be applied, and the frequency for the test signal may be selected to be at least twice the tachometer signal frequency that corresponds to the selected PWM duty cycle value. Note that this analysis may be performed for any fan, including fan 128, which may be selected from a variety of available fans. Some fans may generate more tachometer pulses per revolution than others.

In one embodiment, lookup table 120 holds a set of divider coefficients corresponding to respective PWM duty cycle values for fan 128, such that an appropriate frequency for test signal 150 may be generated from base frequency 118. In alternate embodiments, lookup table 120 may hold multiple sets of frequency divider coefficient values, each set of frequency divider coefficient values corresponding to a particular fan and to the set of PWM duty cycle values associated with the particular fan. Furthermore, the aforementioned divider coefficient values may be user programmed into look-up table 120 via input line 141 during system operation. The PWM duty cycle values may be selected based on what expected PWM duty cycle values might be programmed into register 122 during system operation. In a preferred embodiment, every time a new PWM duty cycle value is programmed into register 122, a corresponding divider coefficient is selected from lookup table 120 and provided to down counter 116, resulting in test signal 150 being generated at a frequency corresponding to the currently used PWM duty cycle.

Figure 2:
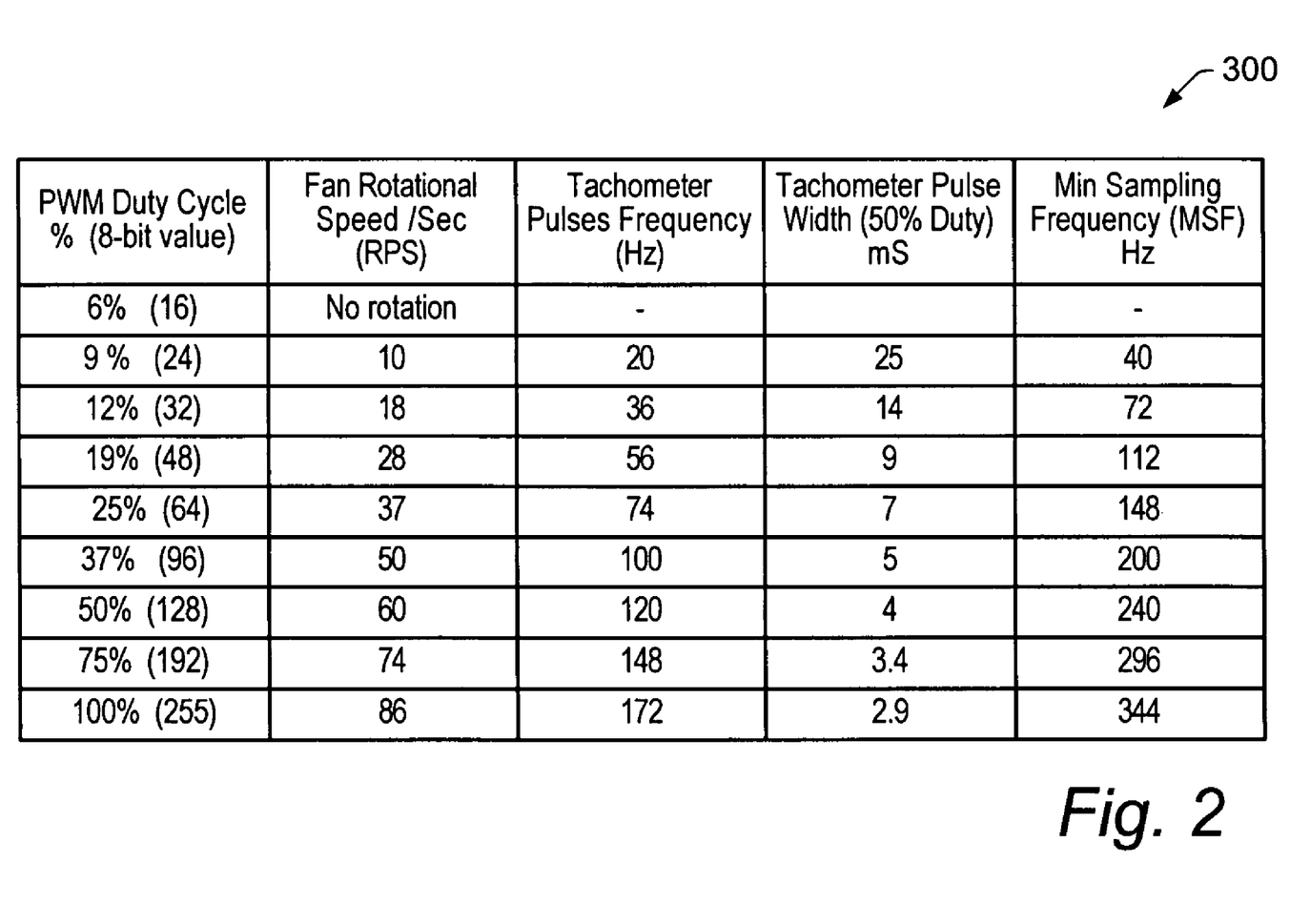
FIG. 2 illustrates a table showing a relationship between PWM duty cycle values and corresponding test signal frequencies, according to one embodiment of the present invention.

Table 300 in FIG. 2 illustrates one set of possible PWM duty cycle values for PWM signal 152 and corresponding frequency values for test signal 150. In this example, fan 128 is a fast fan that generates 2 tachometer pulses per revolution and has an RPM of around 6000 at a PWM duty cycle value of 100%. Column one of table 300 includes the PWM duty cycle percentage values, and corresponding 8-bit binary values (shown in parentheses) assigned to the percentage values. The fan rotational speed (measured in revolutions per second) for each PWM duty cycle value is shown in column two of table 300, with a corresponding tachometer pulse frequency for each rotational speed value in column three. For each tachometer frequency value a corresponding tachometer pulse width (at 50% duty cycle) measured in milliseconds is shown in column four, with column five containing the minimum frequencies (in Hz) that are to be used when generating test signal 150 for the corresponding PWM duty cycle value. Note that the frequency values in column five are multiples of two of the corresponding frequency values in column 3, reflecting the use of Nyquist's sampling theorem when selecting the appropriate frequency for test signal 150. Other tables similar to table 300 may be created for different fans and different selections for the duty cycle values of PWM signal 152. It will be evident to those skilled in the art that this method is in no way limited to the values used in the example of table 300.

It should also be noted that an embodiment such as shown in FIG. 1 may also be used to obtain the divider coefficients for fan 128 by selecting the frequency of test signal 150 to be at least twice the frequency of tachometer signal 154 obtained at a PWM duty cycle of 100%. This method may be most useful in embodiments where the speed of the fan may not increase, though it may decrease, due to causes other than the PWM signal generator. The thus selected frequency of test signal 150 will be sufficiently high to accurately measure the rotational speed of fan 128 for any selected PWM duty cycle value, and the individual minimum frequency of test signal 150 for each corresponding PWM duty cycle value may be determined using the frequency of tachometer signal 154 at the corresponding PWM duty cycle value, and Nyquist's sampling theorem as previously described.

In one embodiment, test signal 150 operates to obtain tachometer pulses from fan 128 even during time periods when PWM signal 152 might be unasserted. By multiplexing test signal 150 with PWM signal 152 using OR gate 126, and using the resultant output from OR gate 126 as PWM output 156 provided to FU 108, tachometer pulses may be obtained every time a pulse is present in test signal 150, provided that there is in fact a tachometer pulse present at the time of a pulse being present in test signal 150. By selecting the frequency of test signal 150 as previously described, all necessary tachometer pulses—of the appropriate width—may be recreated. This in turn may allow counting the tachometer pulses for a determined period of time, thus obtaining the RPM of fan 128.

Still referring to FIG. 1, in one embodiment the count may be achieved by using tachometer signal 154 as a reset input into flip-flop 112 and into down counter 117, and by clocking flip-flop 112 using output 162 of down counter 117, with a logic value '1' being tied to input 158 of flip-flop 112, which results in flip-flop 112 outputting recreated tachometer pulses via a recreated tachometer signal 159. Frequency of output signal 162 of down counter 117 may be set by providing base frequency 118 to an appropriate input of down counter 117, and also providing to down counter 117, from look-up table 120, divider coefficient $M_x$ (corresponding to PWM duty cycle value x), to which a value n may be added to determine the current frequency of output signal 162. The value of 'n' may be selected to be higher than one, but lower than $M_x$. Thus, the frequency of output signal 162 may be slightly lower than the frequency of test signal 150. In other words, the expiration time of down counter 117 may be, for example, ten to twenty percent longer than a period of test signal 150, i.e. the expiration time of down counter 116. Either a tachometer pulse or a noise spike present in tachometer signal 154 may reset down counter 117 and flip-flop 112. In case no such pulse is present, regardless of whether PWM signal 152 is asserted, down counter 117 may issue a carry upon expiration of its time interval. This carry may set flip-flop 112. The next tachometer pulse may reset flip-flop 112 and down counter 117. As a result, the flip-flop may issue a recreated tachometer pulse every time a tachometer pulse in tachometer signal 154 is detected. The recreated tachometer pulses may then be provided to pulse counter 114, and the output of counter 114 will be fan RPM value 138. In some systems, fan RPM value 138 may be used as a feedback signal to determine if the speed of fan 128 needs to be altered, which may be accomplished by reprogramming PWM register 122 with an appropriate PWM duty cycle value as warranted by the current status of the system.

Figure 3:
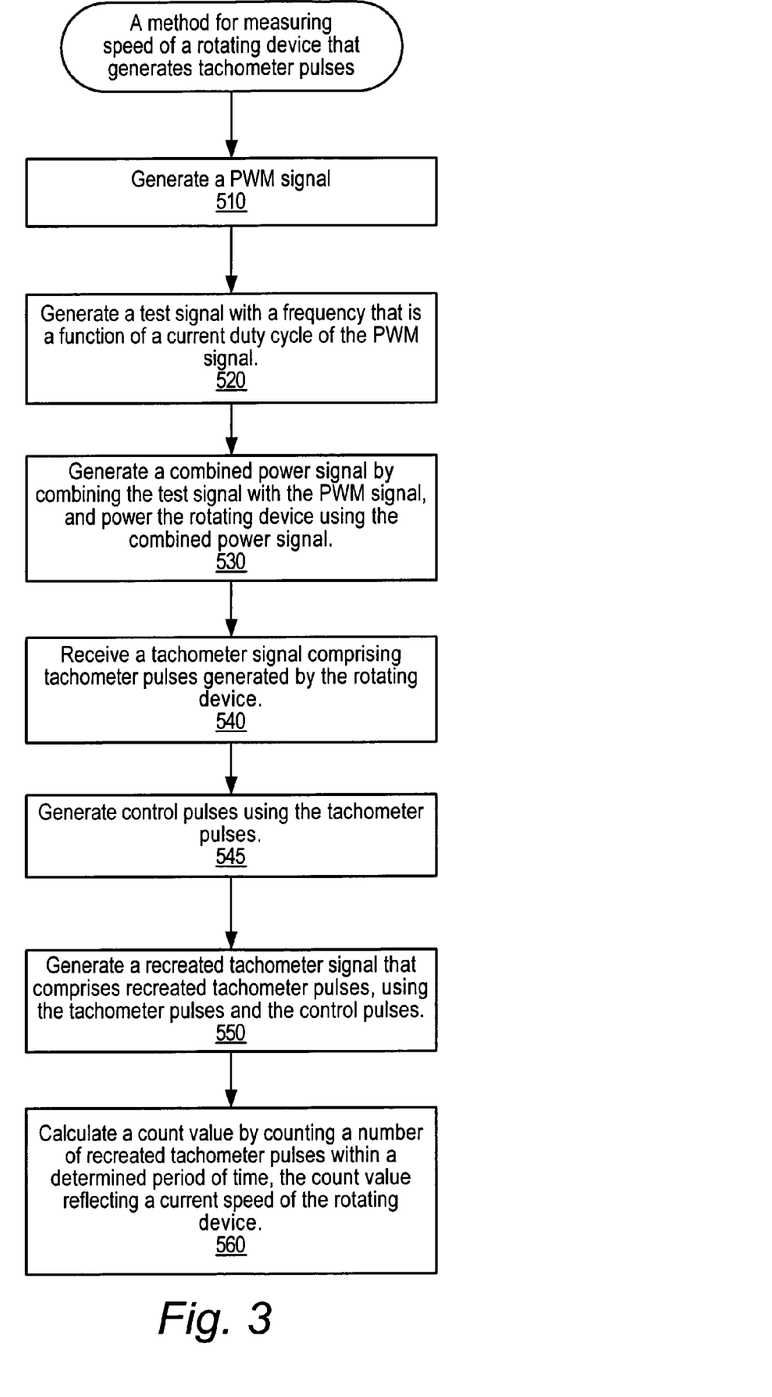
FIG. 3 illustrates a flowchart of one embodiment of a method to measure the speed of a rotating device, for example a fan, in accordance with the present invention.

FIG. 3 illustrates a flowchart of one embodiment of a method to control and measure the speed of a rotating device, for example a fan in a computer system. A PWM signal operable to power the rotating device may be generated (510). Duty cycle value of the PWM signal may be user programmable and may be changed during system operation as required, based on various parameters describing a current state of the system in order to alter speed of the fan. In one embodiment, a test signal with a frequency that is a function of the current duty cycle of the PWM signal is generated (530), and subsequently combined with the PWM signal, thus generating a combined power signal (530). In this embodiment, the combined power signal is used to power the rotating device (530). In one embodiment, the test signal may be combined with the PWM signal in such a manner that test pulses provided by the test signal may briefly power the fan even when the PWM signal might be deasserted. A tachometer signal comprising tachometer pulses generated by the rotating device may be received (540) and used to generate control pulses (545).

In some embodiments, frequency of the test signal may be generated as a function of the current duty cycle value of the PWM signal. In other embodiments the frequency of the test signal may represent a frequency that is at least twice a highest frequency of the tachometer signal. Frequency of the tachometer signal may reflect a current rotational speed of the fan. In one embodiment, frequency of the control pulses is selected to be lower than the frequency of the test signal. In some embodiments the frequency of the control pulses differs from the frequency of the test signal by a substantially low percentage. A recreated tachometer signal comprising recreated tachometer pulses may be generated using the tachometer pulses and the control pulses (550). In one embodiment this is accomplished by applying the tachometer signal as a reset signal to a down counter and a latch. In this embodiment, each tachometer pulse will reset the down counter and the latch. An output signal generated by the down counter may comprise the control pulses, and may be coupled to the latch such that each control pulse may set the latch. In one embodiment, an output of the latch is the recreated tachometer signal comprising the recreated tachometer pulses. A count value may be calculated by counting a number of recreated tachometer pulses during a determined period of time (560), where the count value corresponds to the current measured speed of the fan, or RPM value of the fan.

Thus, various embodiments of the systems and methods described above may facilitate design of a tachometer system to accurately measure speed of a rotating device, for example a fan in an electrical system, while minimizing audio noise and sensitivity to electrical noise, and maintaining smooth device operation.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

I claim:

1. A system for determining speed of a fan powered by a power supply configured to provide a pulse width modulated (PWM) signal to the fan, wherein the fan is operable to generate tachometer pulses indicative of a current speed of the fan, the system comprising:
   a test circuit operable to generate test pulses and to provide the test pulses to the fan, wherein a current frequency of the test pulses is proportional to a current frequency of the tachometer pulses;
   a frequency divider operable to generate control pulses and configured to receive the tachometer pulses, wherein each one of the tachometer pulses is operable to reset the frequency divider; and a latch configured to receive the tachometer pulses and the control pulses, wherein each one of the tachometer pulses is operable to reset the latch and each one of the control pulses is operable to set the latch;

wherein a current frequency of the control pulses is lower than the current frequency of the test pulses;

wherein the latch is operable to output recreated tachometer pulses;

wherein a current frequency of the recreated tachometer pulses corresponds to the current speed of the fan; and wherein the test pulses operate to provide power to the fan.

2. The system of claim 1, wherein at least one respective test pulse of the test pulses is operable to power the fan when the respective test pulse is generated during a time when the PWM signal is deasserted, wherein the fan will remain powered for the duration of the respective test pulse.

3. The system of claim 2, wherein a duty cycle of the current frequency of the test pulses is substantially lower than 10%.

4. The system of claim 1 further comprising a counter configured to receive the recreated tachometer pulses;

wherein the counter is operable to output a count value corresponding to a current speed of the fan.

5. The system of claim 1, wherein the latch is a negative edge triggered flip-flop.

6. The system of claim 1, wherein the latch is an SR-latch.

7. The system of claim 1;

wherein the test circuit is configured to receive a current duty cycle value of the PWM signal;

wherein the test circuit is further operable to determine the current frequency of the test pulses as a function of the current duty cycle value of the PWM signal.

8. The system of claim 1, wherein the test circuit comprises:

a lookup table configured to receive a current duty cycle value of the PWM signal, and operable to provide a divider coefficient value based on the current duty cycle value of the PWM signal;

a down counter configured to receive the divider coefficient value and a base frequency value, and operable to generate the test pulses, wherein the current frequency of the test pulses is obtained from the base frequency value and the divider coefficient value.

9. The system of claim 8;

wherein the lookup table is user-programmable; and wherein the lookup table is operable to be programmed during operation of the system.

10. The system of claim 8;

wherein the frequency divider is configured to receive the divider coefficient value and the base frequency value; and wherein the current frequency of the test pulses is obtained from the base frequency value, the divider coefficient value, and a predetermined constant value that is greater than one and less than the divider coefficient value.

11. The system of claim 10, wherein the predetermined constant value is substantially less than the divider coefficient value.

12. The system of claim 1, wherein the current frequency of the test pulses is at least twice the current frequency of the tachometer pulses.

13. A system for measuring speed of a fan, wherein the fan is operable to generate tachometer pulses having a current frequency corresponding to a current speed of the fan, the system comprising:

a signal generator configured to provide a pulse width modulated (PWM) signal to the fan, wherein the PWM signal is operable to control the speed of the fan, and wherein a current duty cycle value of the PWM signal reflects a desired speed of the fan;

a test circuit operable to generate a test signal with a current frequency that is a function of the current duty cycle value of the PWM signal;

a frequency divider operable to generate control pulses and configured to receive the tachometer pulses, wherein each one of the tachometer pulses is operable to reset the frequency divider; and a latch configured to receive the tachometer pulses and the control pulses, wherein each one of the tachometer pulses is operable to reset the latch and each one of the control pulses is operable to set the latch;

wherein a current frequency of the control pulses is lower than the current frequency of the test signal;

wherein the latch is operable to output recreated tachometer pulses;

wherein a current frequency of the recreated tachometer pulses corresponds to the current speed of the fan; and wherein the test signal operates to provide power to the fan.

14. The system of claim 13;

wherein at least one respective test pulse comprised in the test signal is operable to power the fan when the respective test pulse is generated during a time when the PWM signal is deasserted, wherein the fan will remain powered for the duration of the respective test pulse.

15. The system of claim 13, wherein a duty cycle of the frequency of the test signal is substantially lower than 10%.

16. The system of claim 13 further comprising a counter configured to receive the recreated tachometer pulses;

wherein the counter is operable to output a count value corresponding to a current speed of the fan.

17. The system of claim 13, wherein the latch is an SR-latch.

18. The system of claim 17, wherein the latch is a negative edge triggered flip-flop.

19. The system of claim 13, wherein the current frequency of the test signal is at least twice the current frequency of the tachometer pulses.

20. The system of claim 13, wherein the test circuit comprises:

a lookup table configured to receive the current duty cycle value of the PWM signal, and operable to provide a divider coefficient value based on the current duty cycle value of the PWM signal;

a frequency down counter configured to receive the divider coefficient value and a base frequency value, and operable to generate the test pulses, wherein the current frequency of the test pulses is obtained from the base frequency value and the divider coefficient value.

21. The system of claim 20;

wherein the lookup table is user-programmable; and wherein the lookup table is operable to be programmed during operation of the system.

22. The system of claim 20;

wherein the frequency divider is configured to receive the divider coefficient value and the base frequency value; and wherein the current frequency of the test signal is obtained from the base frequency value, the divider coefficient value, and a predetermined constant value that is greater than one and less than the divider coefficient value.

23. The system of claim 22, wherein the predetermined constant value is substantially less than the divider coefficient value.

24. A system for measuring speed of a fan in a system comprising a fan and a signal generator, wherein the fan is operable to generate tachometer pulses having a frequency corresponding to a current speed of the fan, wherein the signal generator is configured to provide a pulse width modulated (PWM) signal to the fan, wherein the PWM signal is operable to control the speed of the fan, and wherein a duty cycle value of the PWM signal reflects a desired speed of the fan, the system comprising:
  a test circuit operable to generate a test signal with a frequency that is proportional to the duty cycle value of the PWM signal; and
  a frequency divider operable to generate control pulses and configured to receive the tachometer pulses, wherein each one of the tachometer pulses is operable to reset the frequency divider; and
  a latch configured to receive the tachometer pulses and the control pulses, wherein each one of the tachometer pulses is operable to reset the latch and each one of the control pulses is operable to set the latch;
  wherein a current frequency of the control pulses is lower than the current frequency of the test signal;
  wherein the latch is operable to output recreated tachometer pulses;
  wherein a current frequency of the recreated tachometer pulses corresponds to the current speed of the fan; and
  wherein the test signal operates to provide power to the fan.

25. A system comprising:
  a fan operable to generate tachometer pulses having a frequency corresponding to a current speed of the fan;
  a signal generator configured to provide a pulse width modulated (PWM) signal to the fan, wherein the PWM signal is operable to control the speed of the fan, and wherein a duty cycle value of the PWM signal reflects a desired speed of the fan;
  a test circuit operable to generate a test signal with a frequency that is proportional to the duty cycle value of the PWM signal;
  a frequency divider operable to generate control pulses and configured to receive the tachometer pulses, wherein each one of the tachometer pulses is operable to reset the frequency divider; and
  a latch configured to receive the tachometer pulses and the control pulses, wherein each one of the tachometer pulses is operable to reset the latch and each one of the control pulses is operable to set the latch;
  wherein a current frequency of the control pulses is lower than the current frequency of the test signal;
  wherein the latch is operable to output recreated tachometer pulses;
  wherein a current frequency of the recreated tachometer pulses corresponds to the current speed of the fan.

26. The system of claim 25, wherein the test circuit is operable to provide the test signal to the fan, and wherein the fan is further operable to generate a tachometer pulse based on a current rotational state of the fan in response to a test signal pulse in the test signal.

27. The system of claim 25, wherein the fan speed is rotational fan speed.

28. The system of claim 25, wherein the signal generator is configured to receive a count value of a number of recreated tachometer pulses, and is operable to update the duty cycle of the PWM signal based on the count value; wherein the count value reflects the current speed of the fan.

29. The system of claim 25, wherein the signal generator is a PWM signal generator.

30. The system of claim 25, further comprising a duty cycle register configured to supply the test circuit with data specifying a number of pulses to create in the test signal for a given time period.

31. The system of claim 25 further comprising a counter operable to receive the recreated tachometer pulses and to generate a count value based on the recreated tachometer pulses.

32. The system of claim 25, wherein the frequency of the test signal is at least double a frequency of the tachometer pulses determined by the duty cycle value of the PWM signal.

33. The system of claim 25, wherein a count of the tachometer pulses corresponds to the current speed of the fan.

34. The system of claim 25, wherein the system is a fan-based cooling system for cooling an electronic device.

35. The system of claim 34, wherein the system is a computer cooling system.

36. A method for measuring speed of a fan, the method comprising:
  generating a PWM power signal to power the fan;
  generating test pulses, wherein a current frequency of the test pulses is proportional to a current duty cycle value of the PWM power signal;
  operating the test pulses to power the fan, wherein the fan remains powered for the duration of each of the test pulses;
  receiving tachometer pulses from the fan;
  generating control pulses using the tachometer pulses, wherein a current frequency of the control pulses is lower than the current frequency of the test pulses;
  generating recreated tachometer pulses using the tachometer pulses and the control pulses;
  counting a number of recreated tachometer pulses during a determined period of time; and
  calculating a count value based on the number of fan pulses;
  wherein the count value reflects the current speed of the fan.

37. The method of claim 36, wherein the current frequency of the test pulses is at least twice a current frequency of the tachometer pulses.

38. A method for measuring speed of a fan operable to be powered by a pulse width modulated (PWM) power signal, wherein the fan is operable to generate a tachometer signal indicative of a current speed of the fan, the method comprising:
  generating a test signal, wherein a current frequency of the test signal is proportional to a current duty cycle value of the PWM power signal;
  generating a combined power signal by combining the test signal with the PWM signal, and powering the fan with the combined power signal;

generating control pulses using the tachometer signal, wherein a current frequency of the control pulses is lower than the current frequency of the test signal;

generating a recreated tachometer signal using the tachometer signal and the control pulses;

calculating a count value based on the recreated tachometer signal;

wherein the count value reflects the current speed of the fan.

39. The method of claim 38, wherein in said powering the fan with the combined power signal at least one respective test pulse comprised in the test signal is operable to power the fan when the respective test pulse is generated during a time when the PWM power signal is deasserted, wherein the fan will remain powered for the duration of the respective test pulse.

40. The method of claim 39, wherein a duty cycle of the current frequency of the test signal is substantially lower than 10%.

41. The method of claim 38;

wherein the recreated tachometer signal comprises recreated tachometer pulses;

wherein said calculating comprises counting a number of recreated tachometer pulses within a predetermined period of time;

wherein the count value is the number of recreated tachometer pulses counted within the predetermined period of time.

42. The method of claim 38, wherein said generating the test signal comprises:

receiving a current duty cycle value of the PWM power signal; and determining the current frequency of the test signal as a function of the current duty cycle value of the PWM power signal.

43. The method of claim 38, wherein said generating the test signal comprises:

providing a divider coefficient value based on the current duty cycle value of the PWM power signal; and dividing a base frequency by the divider coefficient value to obtain the current frequency of the test signal.

44. The method of claim 38, wherein said generating the control pulses comprises:

receiving a current duty cycle value of the PWM power signal; and determining the current frequency of the control pulses as a function of the current duty cycle value of the PWM power signal.

45. The method of claim 38, wherein said generating the control pulses comprises:

providing a divider coefficient value based on the current duty cycle value of the PWM power signal;

adding an offset number to the divider coefficient value to obtain a new divider coefficient value;

dividing a base frequency by the new divider coefficient value to obtain the current frequency of the control pulses.

46. The method of claim 38, wherein the current frequency of the test signal is at least twice the current frequency of the tachometer signal.

* * * * *